United States Patent [19]

Silvola

[11] Patent Number: 4,802,588
[45] Date of Patent: Feb. 7, 1989

[54] PLANT GROW AND TRANSPORT PALLET

[76] Inventor: Aarre Silvola, 2910 Rainbow Glen Rd., Fallbrook, Calif. 92028

[21] Appl. No.: 601,503

[22] Filed: Apr. 18, 1984

[51] Int. Cl.⁴ .............................................. B65D 21/02
[52] U.S. Cl. .................................................... 206/511
[58] Field of Search ........................ 206/511; 220/23.4

[56] References Cited

U.S. PATENT DOCUMENTS

| | | |
|---|---|---|
| 819,112 | 5/1906 | Wylie ..................................... 220/20 |
| 1,947,055 | 2/1934 | Moorman .............................. 206/511 |
| 2,456,481 | 12/1948 | Ballantyne et al. . |
| 2,632,567 | 3/1953 | Richtmyer ............................ 206/511 |
| 3,056,526 | 10/1962 | Harris .................................... 206/511 |
| 3,118,249 | 1/1964 | Bard et al. . |
| 3,314,192 | 4/1967 | Park . |
| 3,361,293 | 1/1968 | Box . |
| 3,608,240 | 9/1971 | Bunn . |
| 3,842,534 | 10/1974 | Walters ................................ 206/511 |
| 3,887,073 | 6/1975 | Wilson . |
| 3,935,673 | 2/1976 | Robins . |
| 4,001,966 | 1/1977 | Metzner . |
| 4,225,626 | 9/1980 | Chiu .................................... 220/23.4 |

FOREIGN PATENT DOCUMENTS 2259020  8/1975  France ................................ 206/511

Primary Examiner—George E. Lowrance
Attorney, Agent, or Firm—Baker, Maxham & Jester

[57] ABSTRACT

A plant grow and transport pallet is constructed to be stackable and includes an open, generally rectangular frame including a pair of siderails with a plurality of cross bars extending between the siderails and a pair of end rails or panels extending downward defining legs with a lower edge or foot to fit into internal ledges in the top of another pallet to facilitate stacking of the pallets. The end panels are of such depth as to serve as legs to support the trays within each pallet a sufficient distance above the next lower pallet to prevent crushing or damage to the plants on the respective lower pallets.

5 Claims, 1 Drawing Sheet

PLANT GROW AND TRANSPORT PALLET

BACKGROUND OF THE INVENTION

The present invention relates generally to pallets and pertains particularly to a novel stackable pallet for growing and transporting of plants.

In the nursery business, seeds are planted for germination in enlarged multi-compartment trays or in individual small pots in large trays. Most plants are permitted to grow to a predetermined size before being transported and transplanted for future growth. A large number of seedlings are frequently handled in a transplant operation, particularly in agricultural operations. It is frequently necessary to permit the plants to attain a certain minimal size before being transplanted to the field for further growth such as for ultimate agricultural production.

Plants normally remain in the initial trays until transplanted in the field. Frequently the transplantation is carried out by machines which selectively place the individual plants in a particular position along selected rows The transportation of plants from the nursery to the field for planting is typically carried out by placing the trays on pallets and placing the pallets in a single layer on flatbed trucks. This limits the load capability of the truck to a single layer of pallets unless special racks are constructed for supporting vertical tiers of pallets or the like. By enabling a vehicle to carry a number of different layers of pallet loads of plants, the number of trips is considerably reduced, thereby reducing labor and transportation, and thereby the cost of operation. It is therefore desirable that some means be available for stacking pallet loads of plants in vertical stacks without the necessity of specially constructed racks.

It is also frequently desirable to reduce the handling of trays of plants by placing the growing trays on pallets on which they remain during the growth and transportation stages. It is also desirable that some means be available for growing the plants in multiple layers of vertical tiers, as well as transporting multiple layers of the plants.

SUMMARY AND OBJECTS OF THE INVENTION

It is therefore the primary object of the present invention to provide an improved growing and transporting pallet.

In accordance with the primary aspect of the present invention, a growing and transporting pallet has a generally rectangular frame specially constructed with end support legs for fitting into recesses in the top of each respective pallet to make the pallets stackable with spacing to accommodate plants within the stacked pallets without damage to the plants.

BRIEF DESCRIPTION OF THE DRAWINGS

The above and other objects and advantages of the present invention will become apparent from the following description when read in conjunction with the drawings wherein.

DETAILED DESCRIPTION OF A PREFERRED EMBODIMENT

Figure 1:
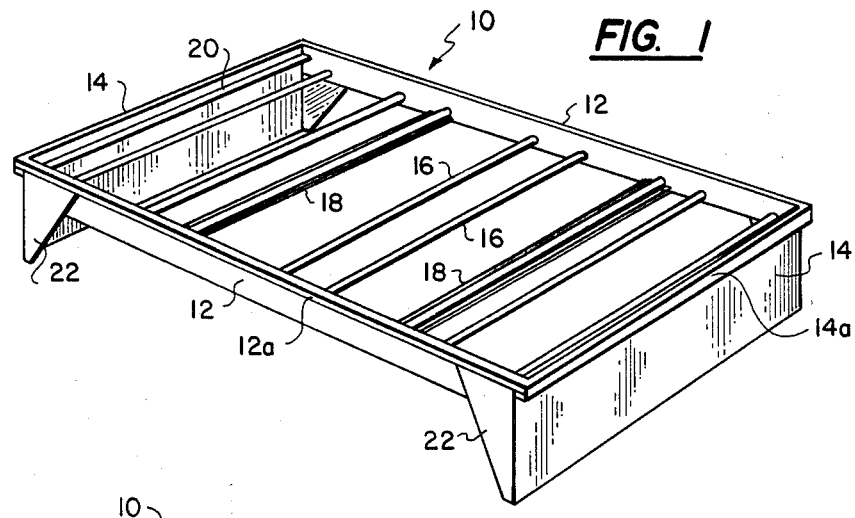
FIG. 1 is a perspective view of a preferred embodiment of the pallet.

Referring to FIG. 1 of the drawings, an exemplary embodiment of a pallet in accordance with the invention is illustrated. In the illustrated embodiment, the pallet comprises a generally open rectangular frame constructed of a pair of parallel disposed side rails 12 connected together at the ends by a pair of end rails or panels 14 which serve also as vertical legs or support members for the pallet. The structure is preferably constructed of extruded aluminum or a suitable lightweight material for most applications. However, more rugged high strength pallets can be constructed of other materials such as stainless steel or the like. Also, the rails may be constructed from sheets of metal such as steel, aluminum or the like. The rails each include an outwardly extending flange 12a which is preferably formed integral with this rail.

Figure 2:
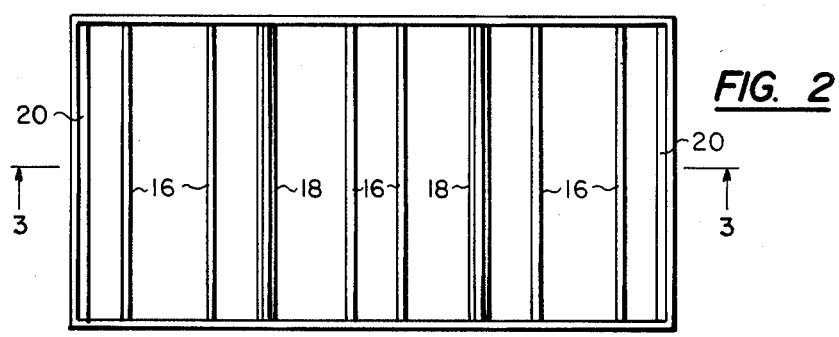
FIG. 2 is a top plan view of the embodiment of FIG. 1.

A plurality of tray supporting cross members or rails 16 are disposed in pairs between the side rails 12. These tray supporting cross members are positioned with spacing for pairs of the cross members to support substantially standard size trays of plants. Thus, the cross members 16 which extend between and are secured to the side rails 12 serve to support a plurality of growing trays. The cross members are positioned in pairs such that trays are supported by a pair of the members. The pallet is preferably on the order of a size to support three trays, for example on each pair of cross members with four sets of the cross members for supporting trays, for a total on the order of about a dozen trays per pallet, as shown in phantom in FIG. 2. Many other configurations of the pallet are possible within the scope of the invention. However, the pallets should be constructed to accommodate standard size trays and themselves be of a somewhat standard size to fit conventional size truck beds and other similar transport vehicles.

A pair of fork support members 18 are disposed beneath a pair of the cross members 16, (FIGS. 1, 2 and 3) for engagement with the forks or tines of a forklift truck to provide reinforcement and support for the pallet when handled by a lift truck. The cross members 16 are disposed closely adjacent to the very lower edge of the respective siderails 12 such that the trays are accommodated within a confining peripheral structure of the side rails 12 and end rails 14.

Figure 4:
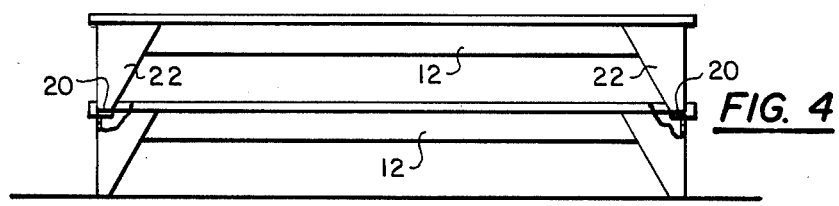
FIG. 4 is a side elevation view showing the pallets in a stacked configuration.

Disposed at each end and adjacent or just below the upper edge of the frame is an internal ledge 20 extending completely across and just inside the respective end panels 14. These internal ledges are designed to engage and support the lower edges of the end support rails or panels 14 (FIG. 4). The lower edges of the end support members 14 fit into and rest on these ledges of the pallet below for nesting and stacking a plurality of the pallets. The lower edge of each of the end panels is then confined laterally and longitudinally by the side rails 12 and the end panels 14.

The end support panels 14 are preferably of a depth to accommodate fairly large plants on the pallet below without crushing the plants. While the trays can be sized and specially constructed for particular size plants, a standard size may provide a clearance of on the order of around 12 to 14 inches. Such could accommodate a great deal of the agricultural and forest type seedlings that would be planted today. The end panels 14 also include a flange 14a along the top edge thereof.

Each of the end vertical support panels 14 are additionally reinforced and secured to the siderails 12 by means of generally triangular shaped panels 22 disposed at each corner of the frame or pallet. These corner panels 22 are secured such as by welding or the like to the side rails 12 and to the end panels 14.

Figure 3:
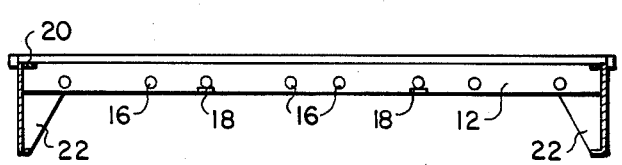
FIG. 3 is a section view taken generally on line 3—3 of FIG. 2.

In the preferred construction of the pallets, the side rails 12 are preferably slightly bowed upward in the center as depicted by the Phantom line in FIG. 3, when not loaded. This provides a pre-stressing of the side rails 12 such that when the pallet is fully loaded and resting on the end support of leg members 14, the siderails assume their straight configuration. Another advantage of this arrangement is that when the tray is not fully loaded and not resting on the end panels or end support members 14 the pallet assumes a slight curvature as discussed above permitting the lower ends of the support members 14 to pull inward slightly to provide easier interfitting of the tray on a lower tray (FIG. 4). Thus the pallet essentially contracts when lifted by a forklift truck and when empty to permit easy disengagement of the stacked pallets.

As shown in FIG. 4, the trays may be stacked one on top of another with the legs 14 of an upper pallet 12 engaging the inwardly directed flanges 20 of a lower pallet. Plants in a lower tray are accommodated without being crushed by an upper pallet.

In operation, a pallet is selected and loaded with a plurality of growing trays in which seeds are planted for germination. The pallet is then placed in the appropriate germination atmosphere until the seeds have sprouted and are to undergo a growth period. The pallets may then be transported to a suitable greenhouse or the like for controlled growth of the plants until they are ready for transplant to a farm, forest, or the like. The pallets are then placed on a suitable transport vehicle, either in the stacked condition or stacked onto the vehicle. The pallets then may be transported to the field for transplanting with multiple stacked tiers of the pallets. The pallets may then be unloaded and the trays loaded on planting machines or the like for planting.

During the sprouting and growth cycle, the plurality of the pallets may be stacked thereby accommodating a greater number of seedlings and growth trays for a given space. The pallets may remain stacked throughout the procedures from the initial sprouting or germination phase until the planting phase. In alternate arrangements, the may be loaded after the seedlings have sprouted, or after they have attained a growth sufficient for transplant.

The pallets, in accordance with the invention, accommodate a great variety of growing and handling procedures. The open sides and bottom permits air circulation to plants on the stacked pallets.

While I have illustrated and described my invention by means of specific embodiments it is to be understood that numerous changes and modifications may be made therein without departing from the spirit and scope of the invention as defined in the appended claims.

I claim:

1. A stackable open top pallet for supporting and transporting plants, comprising:
    an open rectangular frame defined by opposed parallel side rails and a pair of opposite end rails;
    a plurality of pairs of tray support cross members secured between opposite sides of said frame for supporting a plurality of growing trays;
    a pair of fork engaging cross members secured to and beneath a pair of said tray support cross members;
    a support flange extending inwardly from said end rails and across each end of said frame; and
    vertically extending support means defined by said end rails extending downwardly from the ends of said frame for engaging the support flange of a lower pallet for support thereof, said support means having sufficient height to enable stacking a plurality of pallets for accommodating predetermined growth of seedlings and for transporting stacks of pallets loaded with seedlings without damaging the seedlings.

2. A stackable open frame growing and transport pallet for supporting a plurality of separate growing trays of seedlings during growth thereof and for transporting stacked pallets of the seedlings, comprising:
    an open rectangular frame defined by opposed parallel side rails and a pair of opposed end rails;
    an array of a plurality of growth tray support cross members secured to and between said side rails of said frame for supporting a plurality of individual growing trays;
    a support flange extending inward from each of said end rails below an upper edge thereof;
    said end rails extending downward from the ends of said frame for defining vertically extending support panels for engaging the support flange of a lower pallet for support of an upper pallet a sufficient height above a lower pallet to accommodate the growth and support of seedlings; and
    a pair of fork lift engaging cross members extending and secured between said side rails for support of the pallet on the forks of a lift truck.

3. A stackable pallet according to claim 2 comprising a generally triangular brace panel at each corner of said frame for bracing said support panel.

4. A stackable pallet according to claim 2 wherein said fork engaging cross members are disposed beneath and reinforce a pair of said growing tray support cross members.

5. A stackable pallet according to claim 2 wherein said cross members are positioned in pairs.

* * * * *